Figure 1:
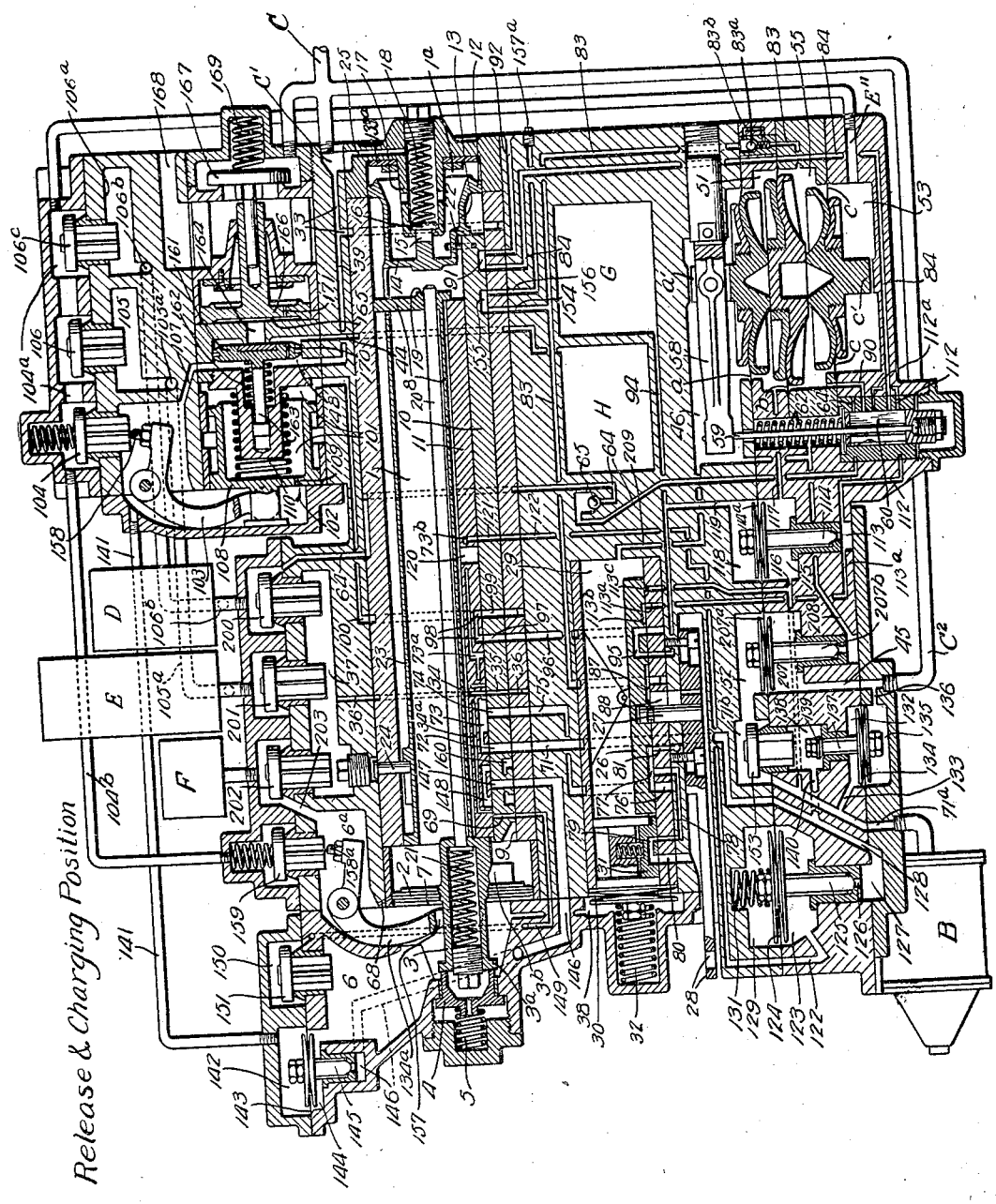

Oct. 30, 1928.

W. ASTLE 1,689,221

AIR BRAKE APPARATUS

Filed July 15, 1927    4 Sheets-Sheet 1

INVENTOR
*William Astle*

BY
ATTORNEYS

Oct. 30, 1928.

W. ASTLE 1,689,221

AIR BRAKE APPARATUS

Filed July 15, 1927     4 Sheets-Sheet 3

INVENTOR
William Astle
BY
ATTORNEYS

Oct. 30, 1928.  
W. ASTLE  
1,689,221  
AIR BRAKE APPARATUS  
Filed July 15, 1927  
4 Sheets-Sheet 4
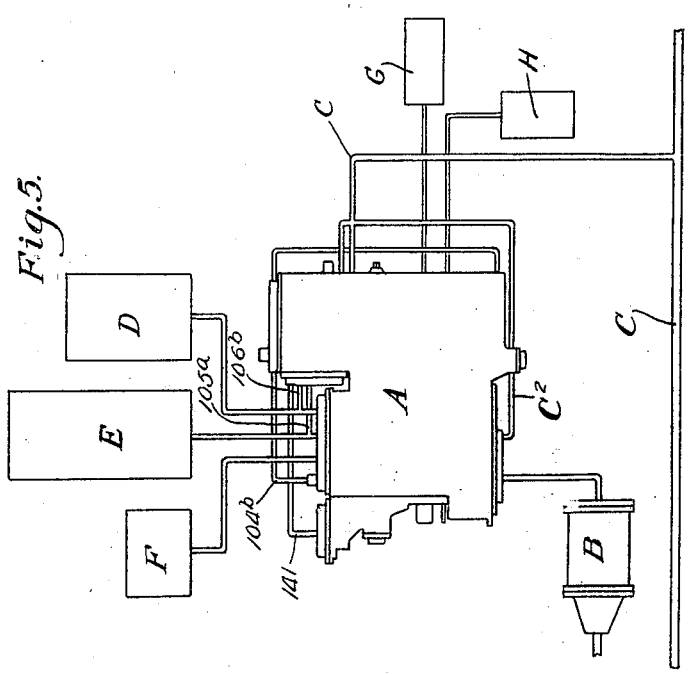
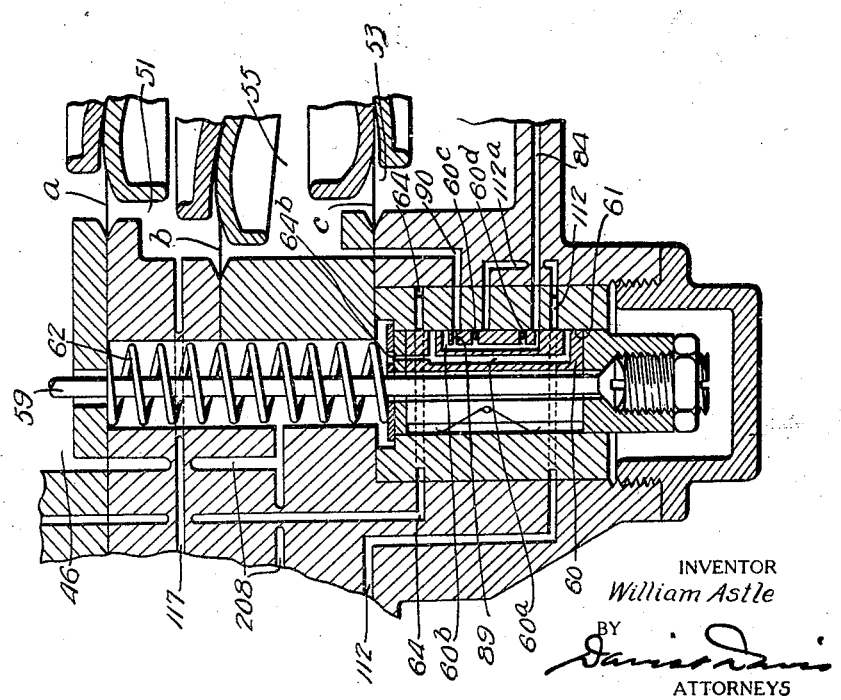
INVENTOR  
William Astle  
BY  
ATTORNEYS Patented Oct. 30, 1928.

1,689,221

UNITED STATES PATENT OFFICE.

WILLIAM ASTLE, OF BROOKLYN, NEW YORK, ASSIGNOR TO AUTOMATIC STRAIGHT AIR BRAKE COMPANY, OF WILMINGTON, DELAWARE, A CORPORATION OF DELAWARE.

AIR-BRAKE APPARATUS.

Application filed July 15, 1927  Serial No. 206,101.

This invention relates to certain improvements in the type of control valves for air brake apparatus shown in Patent Number 1,601,586, dated September 28, 1926.

One of the main objects of the invention is to provide a control valve wherein the emergency brake pipe vent valve will respond only to an emergency reduction of brake pipe pressure, regardless of the position of the main slide valve. The purpose of this is to completely separate the service operation of the valve from the emergency operation thereof; and also to prevent the venting of the brake pipe in the event that the main slide valve in one control valve in the train should accidentally go to emergency position.

Another object of the invention is to provide means in the control valve whereby the brake cylinder pressure will be sealed in the brake cylinder when the brake pipe pressure is reduced below the point of equalization. The purpose of this is to prevent the reduction of brake cylinder pressure when the brake pipe pressure is reduced below the point of equalization of brake pipe and brake cylinder pressures.

Another object of the invention is to provide means to admit brake pipe air to the brake cylinder to cause a quick service serial action of all the control valves in the train, the amount of air thus admitted to the brake cylinder being controlled by a valve interposed between the main and supplemental slide valves and operating to closed position independently of said valves.

Another object of the invention is to provide a valve interposed between the service valve and the brake cylinder to close communication therebetween independently of the service valve in release operations when the control valve is operating in quick release.

There are other important objects and advantages of the invention which will appear hereinafter.

Figure 2:
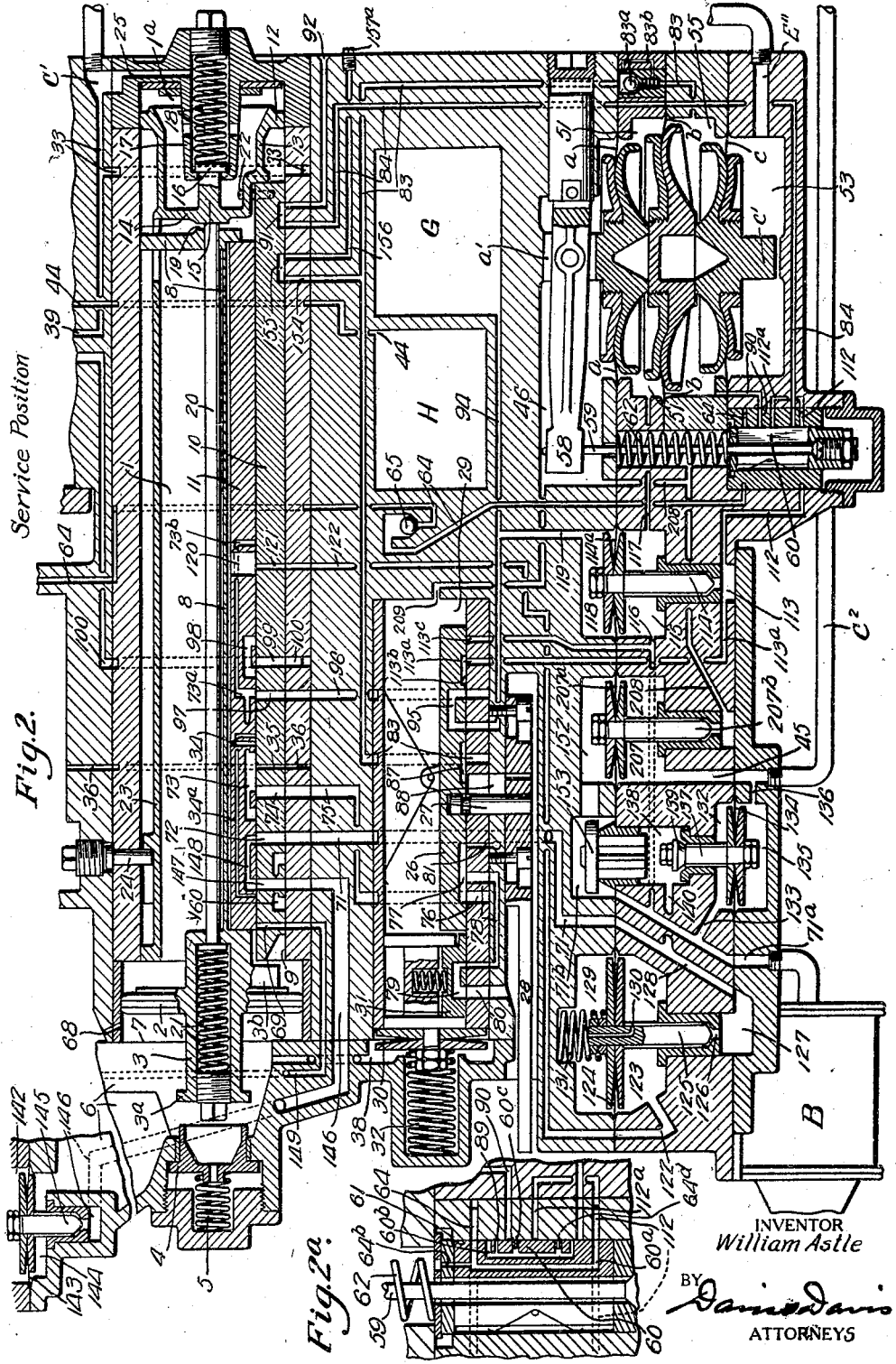
Figure 3:
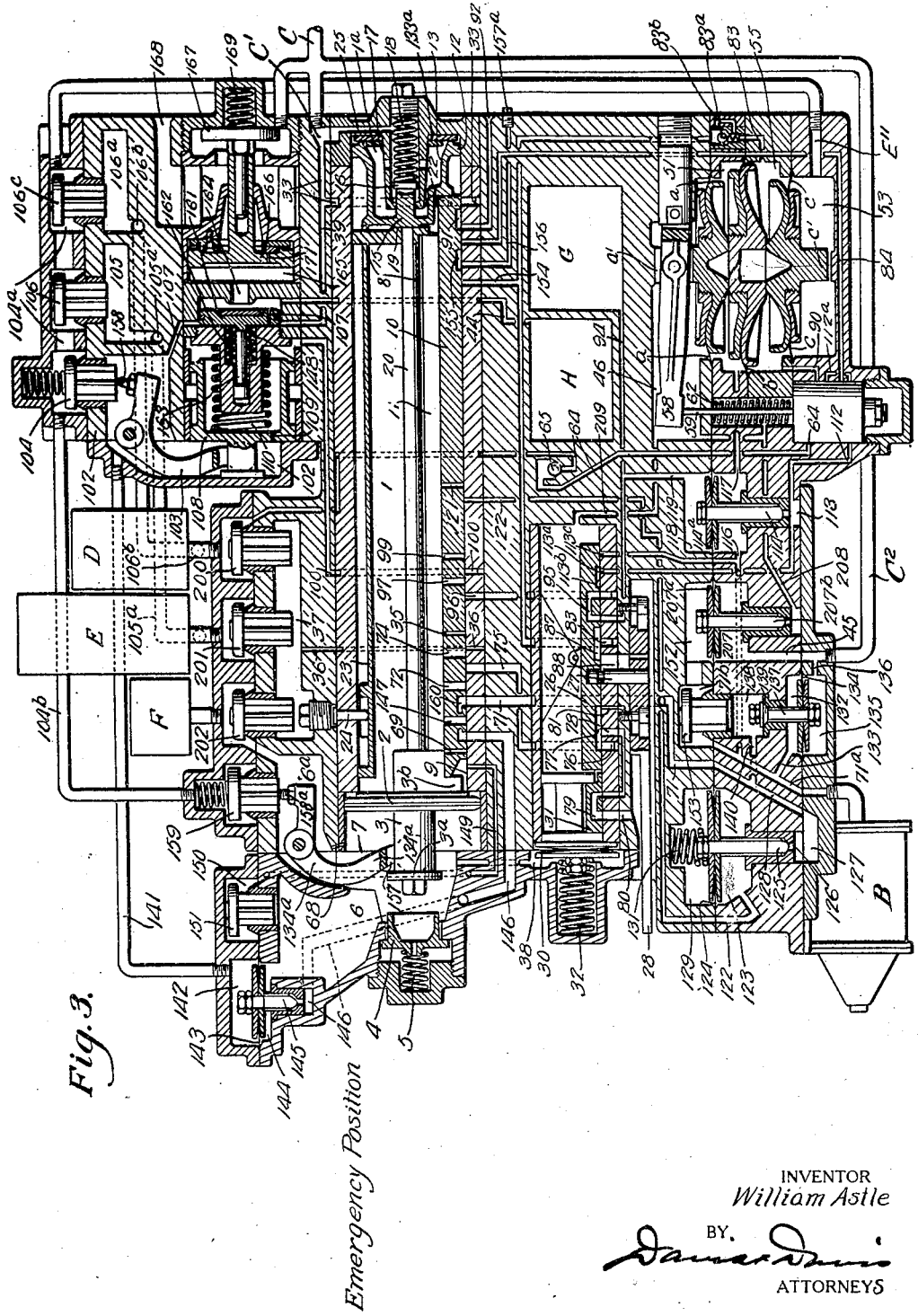

In the drawings:

Fig. 1 is a diagrammatic sectional view of a control valve showing the parts in release and charging position;

Fig. 2 a view similar to Fig. 1, showing the lower half of the control valve, the parts being in service position;

Fig. 2ª a detail sectional view of the service valve in service position;

Fig. 3 a view similar to Fig. 1 showing the parts in emergency position;

Fig. 4 an enlarged sectional view of the service valve in lap position; and

Fig. 5 a diagrammatic view of the apparatus.

In order to simplify the description of the triple valve the various parts and the ports and passages will not be specifically described except in connection with the description of the various operations of the triple valve.

In the diagrammatic view, Fig. 5, A designates the control valve, B the brake cylinder, C the brake pipe, D the service reservoir, E the emergency reservoir, F the actuating reservoir, G the quick-release reservoir, and H the quick-action reservoir.

The main valve device comprises a main valve chamber 1. In this chamber is arranged the main actuating piston 2. The piston 2 separates the main valve chamber 1 from an actuating reservoir chamber 6. The brake pipe is directly connected to the main valve chamber and the actuating reservoir is directly connected to the chamber 6 so that brake pipe pressure is on the inner side of the piston 2 and actuating reservoir pressure is on the outer side of said piston. The piston 2 is formed with an outwardly extending tubular extension 3, the outer end of which is adapted to abut against a spring pressed normal charging stop 4, said stop being held in its normal position by a spring 5. Stop 4 is arranged to hold the piston 2 slightly inwardly from a stop wall 7 so that an excessive brake pipe pressure in chamber 1 will force the piston 2 outwardly against the tension of the spring 5 until said piston abuts against the rigid stop wall 7 of the valve casing. This slight excess movement of the piston under an excessive pressure in chamber 1 is for the purpose of cutting off the brake pipe port to the emergency and service reservoirs and opening a small port leading only to the actuating reservoir. This operation will be more fully hereinafter described. The piston 2 is formed with an inwardly extending valve engaging portion 8, said inwardly extending portion also serving as a guide for the piston and the valve connected thereto. On the main valve seat 9 is arranged a main slide valve 10, and on top of said valve 10 is arranged a supplemental slide valve 11, this later valve being connected to the piston 2 by the inwardly extending part 8. Valve 11 moves with the piston and slides on top of the main valve 10.

In the opposite end of the main valve chamber from the piston 2 is arranged a small service stop piston 12, said piston having an inwardly extending cup-shaped portion 13. The inner wall 14 of this cup-shaped portion is provided with a central outwardly extending stop lug 15 which normally bears against a washer 16 arranged in an inwardly projecting tubular extension 17 of the valve casing. In this tubular extension is arranged a service stop spring 18. The outer wall 19 of the extension 8 is adapted to engage the inner side of the wall 14, said wall 14 serving as a limiting stop for the supplemental slide valve when the piston 2 is moved inwardly upon a service reduction of brake pipe pressure. Mounted in the guide portion 8 is a central longitudinally extending service stop rod 20, one end of which extends into the tubular portion 3 of the main piston 2. Within said tubular portion, the rod 20 is formed with a head which is adapted to engage one end of a comparatively light spring 21. Said spring maintains the rod normally in position so that its free end projects slightly beyond the end wall 19 of the part 8. The end of the rod 20 is adapted to engage the wall 14 and to serve as a service stop for the supplemental valve. Should the brake pipe reduction be sufficient to permit the actuating reservoir air in chamber 6 to move the piston 2 slightly beyond its service application position, spring 21 will be compressed and the wall 19 will be brought into engagement with stop wall 14. This slight excess movement of the supplemental valve beyond service position will open a port to permit an equalization of pressures on opposite sides of the piston 2 to thereby prevent the valves going to emergency position.

The cup-shaped portion of the service stop piston 12 is connected directly to the main slide valve by a pin 22. The piston 12 is also formed with an inwardly extending guide portion 23, said guide portion being arranged to engage a fixed stop 24, said stop positively determining the inner position of the piston 12 and the normal position of the main slide valve. The main slide valve remains in its normal position during all operations of the main valve device except when it moves to emergency position, as will be hereinafter described. The piston 12 forms a small supplemental brake pipe chamber 1ª which is separated from the main valve chamber 1 by said piston. The supplemental chamber 1ª is connected directly to the brake pipe by passage 25.

The manually operable release governing valve consists of a slide valve 26 which is connected by a stem 27 to an operating rod 28. The stem 27 extends upwardly through an operating slot and the said slot serves as a means to limit the in-and-out sliding movement of the valve. To place the valve 26 in its quick release position the operating rod is pulled out, and to place it in its graduated release position the said rod 28 is shoved inwardly. The valve 26 is arranged in a valve chamber 29 and the outer end of this chamber is closed by an exhaust-rate-regulating diaphragm 30. Connected to this diaphragm is a small exhaust-rate-regulating valve 31. A spring 32 bears on the outer side of the diaphragm 30 and holds the valve 31 in its normal release position. The release governing valve chamber 29 is connected to the brake pipe through the actuating chamber 46, so that brake pipe pressure will always be registered in said chamber as long as the brake pipe pressure is above or equal to the brake cylinder pressure. When the brake pipe pressure and the brake cylinder pressure are equal, the actuating chamber 46 and chamber 29 are cut-off from the brake pipe. An excess brake pipe pressure in said chamber 29 will move the valve 31 into restricted release position.

*Release and charging.*

In charging the system brake pipe air flows through the brake pipe connection C', passage and port 33, into the brake pipe chamber 1 of the main control valve, forcing the main piston 2 toward the left until it is stopped by the normal charging stop 4. From the main control valve chamber air passes through port 34 of the valve 11, through port 35 in the main slide valve and passage 36, to the reservoir charging chamber 37. From this chamber air flows past a non-return check valve 200 into the service reservoir D; past a check valve 201 into the emergency reservoir E, and past a check valve 202 into the actuating reservoir F. The reservoir E is of large capacity and the reservoir F is of comparatively small capacity. From a small chamber on top of valve 202 air will flow through passage 203 into chamber 6ª which is directly connected to chamber 6 so that actuating reservoir pressure will always be in chamber 6 and on the outer side of the piston 2. Air will pass from chamber 6 to chamber 38 at the outer side of the diaphragm 30, to oppose brake pipe pressure on the inner side thereof.

From passage 33 air will flow through passage 39 into emergency valve chamber 148 back of emergency valve 161, and thence through a leak port in said valve to a small chamber at the front of said valve, and then through a passage 44 into the quick action reservoir H. From the brake pipe air will flow through brake pipe connection C² to passage 45 into a chamber 207 below a diaphragm 207ª, and then past a normally open check valve 207ᵇ controlled by said diaphragm into a passage 208 which leads into an actuating chamber 46 above an actuating diaphragm *a* of a service valve, hereinafter described. From chamber 46 air will flow through passage 209 into the release governing valve chamber 29.

The brake cylinder chamber 51 is formed between the actuating diaphragm *a* and the equalizing diaphragm *b*. This latter diaphragm is larger in area than the actuating diaphragm, for the purpose which will hereinafter appear. The emergency reservoir E is connected at E″ to the emergency chamber 53 below the emergency diaphragm *c*. Between the diaphragms *b* and *c* is formed a retention chamber 55, for purposes which will be hereinafter described. The emergency diaphragm carries a downwardly extending release stop *c′* and the actuating diaphragm carries an upwardly extending application stop *a′*. These stops limit the movements of the diaphragms. In the actuating chamber is arranged a lever 58. One end of this lever is pivoted on a rigid post secured to the wall of the actuating chamber, the other end thereof being connected to a valve rod 59. Intermediate its ends the lever 58 is pivotally connected to the upwardly extending stop stem *a′* so that the lever will be swung up-and-down by the up-and-down movements of the actuating diaphragm. On the lower end of the valve rod 59 is secured a service and graduated release valve 60, said valve being held yieldingly to its seat 61. Surrounding the valve stem is a lap spring 62 which bears at its lower end upon a lap spring washer and at its upper end against a suitable stop formed in the valve casing. When the actuating diaphragm is moved upwardly the valve 60 is pulled upwardly against the tension of the lap spring. When the desired pressure has been built up in the brake cylinder chamber 51 the valve 60 will be moved downwardly to lap position by the excess pressure on the larger equalizing diaphragm *b*. When the valve is in lap position the lap spring washer rests on a shoulder in the valve casing and the pressure of the spring is taken off the valve and the valve may move down to release position free of the spring.

The lap spring will assist the pressure in the brake cylinder chamber 51 in moving the service valve to lap position. When the valve is relieved of the spring presssure it will remain in lap position. When the pressure in the actuating chamber is raised for the purpose of securing a release of brake cylinder pressure the actuating diaphragm will be moved downwardly and the service valve will be moved down to release position. Upon a reduction of brake pipe pressure the pressure in the actuating chamber will be reduced and then the undisturbed emergency reservoir pressure in the emergency pressure chamber 53 will move all the diaphragms upwardly and carry the service valve to application position. In this movement of the valve spring 62 will be placed under compression.

The service reservoir D is connected to the service valve seat by passage 64 and a check valve 65 is interposed in said passage 64 to prevent the flow of brake pipe air to the service reservoir through passage 64 in the charging operation. In normal charging the emergency reservoir, the actuating reservoir, and the service reservoir are charged at the same time. With an abnormal charging pressure in the brake pipe and in the main valve chamber 1 the valve 11 is moved sufficiently to cut off communication between port 34 and port 35. This stops the charging of the emergency reservoir and the service reservoir through port 34 until the actuating reservoir has been charged to an equality with the brake pipe pressure. The excessive pressure in chamber 1 moves the piston 2 against the tension of the charging stop spring 5 and the normal charging stop 4. The slight excess movement of the piston 2 uncovers a supplemental charging port 68 which connects with the large extension 6ª of the actuating reservoir chamber 6 so that air may flow through said port 68 into the chamber 6 and thence into the actuating reservoir. When the supplemental charging port 68 is uncovered the supplemental slide valve 11 has been moved sufficiently to bring the auxiliary restricted charging port 34ª of the said supplemental valve into register with port 69 and with port 35. This permits air to flow from chamber 6 into the chamber 37 at a reduced rate and thence past the check valves 200, 201 and 202, into the three reservoirs to slowly charge them during the period of excessive pressure in chamber 1. When the actuating reservoir pressure and the pressure in the main valve chamber have equalized, or substantially so, the piston 2 will be moved back to normal charging position and thereafter air will again flow from the chamber 1 to the emergency reservoir, the service reservoir, and to the actuating reservoir through port 34.

In the quick release position of the release governing valve brake cylinder pressure will be released to atmosphere through passage 71ª, chamber 132, past valve 139, through chamber 138, passage 71, port 72 of the main slide valve, port and passage 73 of the supplemental slide valve, port 74 of the main slide valve, passage 75, port 76 in the seat of the release governing valve, cavity 77 in the release governing valve, port and passage 78 in the release governing valve seat, cavity 79 in the release regulating valve 31 and atmospheric port 80. Brake cylinder pressure will also flow from 77 to atmospheric port 81. This is a restricted port and when valve 31 is in closed position port 78 will be closed by valve 31 and brake cylinder pressure will then exhaust through port 81 alone. 80 will be cut off from 78. Valve 31 will be moved when there is excess brake pipe pressure in release governing valve chamber 29.

In the quick release position of the release governing valve pressure will flow from the retention chamber 55 of the diaphragm section through port and passage 83, to cavity 87 in the release governing valve and then to atmosphere through the operating slot 88 of the release governing valve. Pressure from chamber 55 will also blow down through passage 90, through the restricted port 89 and port 60ᵇ in valve 60, passage 84 to a port in the main slide valve seat, cavity 91 in the main slide valve, and atmospheric port 92.

With the release governing valve in graduated release position port 83 is cut off from the atmospheric slot 88. In this position of the release governing valve the blow down from the retention chamber 55 will be through the restricted port 89 up to atmospheric port 92.

In the quick release position of the release governing valve the quick release chamber G is connected by passage 94 with a port 95 in the release governing valve. Port 95 connects to port and passage 96 which leads to a port 97 in the main slide valve, this latter port being connected to a port and passage 98 in the supplemental slide valve. 98 is connected to a port 99 in the main slide valve and this port registers with a port and passage 100 which leads to the quick release piston chamber 101. Chamber 101 therefore will be vented to the quick release chamber G in the release position of the main and supplemental slide valves, when the release governing valve is in quick release position. When the chamber 101 is vented to chamber G which has previously been vented to atmosphere, the pressure in chamber 102 will force the quick release piston inwardly against its spring and throw the lever 103 and open the quick release valve 104. When the quick release valve 104 is open emergency reservoir pressure will flow from chamber 105 past check valve 106 past valve 104 into chamber 102 and thence through passage 107 to the chamber 148 and thence through passages 39 and 33 to the brake pipe; and through passage 33 to the main valve chamber 1. The emergency reservoir is connected to chamber 105 by passage 105ᵃ. The service reservoir D is connected to a chamber 106ᵃ by a passage 106ᵇ. A back pressure check valve 106ᶜ controls communications between chamber 106ᵃ and a passage 104ᵃ above the valves 104, 106 and 106ᶜ, so that service reservoir air may flow into passage 104ᵃ when its pressure exceeds the pressure in said passage. The quick release piston 108 is provided with a small leak port 109 so that the pressures on opposite sides are equalized and the piston will be moved to its normal position by its spring 110.

In the graduated release position of the release governing valve, passage and port 94 is connected to port 83 so that the volume of chamber G is added to the volume of chamber 55. Chamber 101 will then not be vented when the supplemental slide valve goes to release position. Port 96 will be closed thereby preventing the operation of the quick release piston. In the service position of the supplemental slide valve chamber G is vented to atmosphere through the main exhaust port so that the air delivered into said chamber in the quick release operations will be vented to atmosphere when the supplemental valve is moved to service position.

*Service application.*

A service application of the brakes is brought about by a service reduction in brake pipe pressure in the usual manner. A service reduction of brake pipe pressure in chamber 1 will result in a movement of the piston 2 inwardly, or toward the right, as viewed in the drawings, because of the actuating reservoir pressure on the left hand face of the piston. The piston and the supplemental slide valve will move inwardly until the spring-pressed rod 20 contacts with the service stop 14, said service stop forming a part of the service stop piston 12. The service stop piston and the service stop are held in position by the spring 18. The piston 2 will move to service position on a reduction of brake pipe pressure in chamber 1. If there is a rapid pressure reduction the rod 20 will compress the spring 21 and permit the supplemental valve to have a slight excess movement. Spring 21 is lighter than spring 18 so that it will compress before the service abutment 14 is moved against the force of the spring 18. The slight excess movement of the supplemental valve will uncover port 69 in the main slide valve and permit actuating reservoir air to flow into the main valve chamber 1 and balance with the pressure on the reservoir side of the piston 2. This will prevent the piston 2 moving to emergency position. When the pressures on opposite sides of the piston 2 have equalized, or substantially so, the spring 21 will move the supplemental valve back to normal service position and close port 69.

A service reduction of pressure in the actuating chamber 46 will result in an upward movement of the diaphragms $a$, $b$ and $c$, due to the emergency reservoir pressure in chamber 53. The upward movement of the diaphragms will move the valve lever 58 and the valve 60 upwardly. The upward movement of the valve 60 connects the service reservoir passage 64 to the passage 112 through a service port 60ᵃ in valve 60. Passage 112 leads to a small chamber 113 below a valve 114. Valve 114 extends upwardly through a chamber 115 and is connected to a diaphragm 114ª which forms the upper wall of said chamber. Chamber 115 is connected by a passage 116 to a brake cylinder passage 71ª which leads directly to the brake cylinder. Chamber 115 is directly connected to brake cylinder chamber 51 of the diaphragm structure by a passage 117. Service reservoir air, therefore, flows directly to brake cylinder, and brake cylinder pressure flows into chamber 51. The pressure in chamber 115 holds valve 114 in open position.

A chamber 118 is formed above the diaphragm 114ª and said chamber is connected by passage 119 to passage 94 of the quick release reservoir. When the supplemental slide valve 11 is in service position the chamber 118, as well as the quick release reservoir, is vented to atmosphere through passages 119 and 94; port 95 of the release governing valve, port and passage 96, port 97 of the main slide valve, port and passage 73ª of the supplemental valve 11, said latter port and passage connecting directly with cavity 73 of the valve 11. In the service position of the valve 11, cavity 73 remains in communication with port 74.

*Quick service.*

The supplemental slide valve 11 is provided with a port 120, which in the service position of said valve connects the main valve chamber 1 with a port 121 in the main slide valve. This latter port is in register with a port and passage 122 which leads to a chamber 123 so that brake pipe air will flow from chamber 1 into chamber 123. The upper wall of chamber 123 is formed by a diaphragm 124 which carried a depending quick service valve 125 which seats downwardly at 126. Below valve 125 is a small chamber 127 which is connected by a passage 128 to the main brake cylinder passage 71. Above the diaphragm 124 is a chamber 129 which is connected to chamber 123 by a small leak port 130 through the stem of the valve 125. Air will flow from the chamber 1 and the brake pipe to chamber 123 and thence to the brake cylinder, through passage 140, and chamber 138, as hereinafter described, until the pressure in chamber 129, plus the tension of the spring 131 is sufficient to close valve 125. This period is governed by the size of the port 130 and the tension of spring 131, and is so regulated as to give the necessary local reduction in brake pipe pressure to secure a quick service serial action of the control valves. When the valve 125 is closed the flow of brake pipe air to the brake cylinder past the quick service valve is stopped.

When the supplemental valve 11 is in release position chambers 123 and 129 are vented to atmosphere through port 132 in the valve 11, port 73ª, cavity 73 of valve 11, port 74 of the main slide valve, passage 75, and the exhaust passages and ports connected therewith.

The brake cylinder passage 71ª is connected to the brake cylinder and also to a chamber 132 by a passage 133. The lower wall of chamber 132 is formed by a diaphragm 134, and below said diaphragm is a brake pipe chamber 135 connected to the brake pipe at 136. Brake pipe pressure is always in chamber 135 and brake cylinder pressure is always in chamber 132. A stem 137 is connected to the diaphragm 134, extends upwardly into a chamber 138 and carries a downwardly seating exhaust throttle valve 139 which is adapted to close communication between chambers 132 and 138. Valve 139 is held open at all times, except when brake cylinder pressure in chamber 132 exceeds brake pipe pressure in chamber 135. Chamber 138 is connected to passage 128 by a passage 140. Air may flow around valve 139, to and from the brake cylinder, at all times except when said valve is closed by a predominating brake cylinder pressure. When said valve is closed brake cylinder pressure is retained in the valve cylinder.

Chamber 102, which is charged with brake pipe pressure, is connected by passage 141 to a chamber 142, the lower wall of which is formed by a diaphragm 143. Below the diaphragm 143 is a chamber 144 directly connected to the actuating reservoir chamber 6, so that brake pipe pressure is on top of said diaphragm and actuating reservoir pressure on the bottom thereof. Diaphragm 143 carries a depending valve 145 which controls communication between chamber 144 and an actuating reservoir discharge passage 146. Passage 146 leads to a port 147 in the main slide valve. When the supplemental slide valve 11 is in service position port 147 is connected by cavity 148 in said valve 11 to the brake cylinder port 72 so that air will flow from the actuating reservoir to the brake cylinder. A service reduction of brake pipe pressure results in a reduction of pressure in chamber 102 and a corresponding reduction of pressure in chamber 142. Pressure in chamber 6 opens valve 145 and permits air to flow from chamber 6 to the brake cylinder when the valve 11 is in service position. Air will continue to flow from chamber 6 until the pressure therein is equalized with or slightly above the brake pipe pressure in chamber 142, whereupon valve 145 will be closed. The valve 145 is so connected to the diaphragm 143, that when said diaphragm is in balanced position, or nearly so, the valve will be closed. Port 69 in the main slide valve is connected by a passage 149 to a chamber 150 above a check valve 151 controlling a passage into chamber 6. This check valve permits air to flow from chamber 6 to the port 69 but prevents back flow from chamber 1 to chamber 6.

The service valve 60 is provided with a small port 64$^b$ which places the valve chamber and chamber 46 in communication with port 60$^a$ and permits brake pipe air to flow from chamber 46 to the brake cylinder when the service valve is in service position, so that service reservoir air and brake pipe air will flow to the brake cylinder when the service valve is in service position.

Brake cylinder pressure will flow from chamber 115, through passage 117 into the brake cylinder pressure chamber 51 of the diaphragm structure. Brake cylinder pressure will be built up until the pressure in chamber 51 operating on the equalizing diaphragm $b$, plus the brake pipe pressure on the actuating diaphragm $a$, overcomes the emergency reservoir pressure in chamber 53. The service valve 60 will then go to lap position and shut off further flow of brake pipe and service reservoir air to the brake cylinder.

The equalizing diaphragm is properly proportioned with respect to the actuating diaphragm to secure the desired brake cylinder pressure for a given brake pipe reduction. Usually these diaphragms are so proportioned as to bring about a two-and-one-half to one brake cylinder pressure ratio, that is to say, for a ten-pound brake pipe reduction a twenty-five pound brake cylinder pressure will be built up before the valve 60 is moved to lap position.

The supplemental valve 11 will remain in service position. This valve has no service lap position. Should the brake cylinder pressure leak down, the pressure in the brake cylinder chamber 51 will be reduced and the emergency reservoir pressure will then move the valve 60 to service position and the brake cylinder pressure will be built up from the brake pipe and the service reservoir and will be maintained at the predetermined ratio to the brake pipe reduction.

With the release governing valve in graduated release position chamber 113, below valve 114 will be connected by a passage 113$^a$ to a port in the release governing valve seat. A cavity 113$^b$ in the release governing valve will connect said port to a port and passage 113$^c$, this latter passage leading to passage 116. Air flowing through the brake cylinder port 112 may flow to and from passage 116 without passing valve 114 so that in the graduated release operations of the valve the position of valve 114 is immaterial and said valve may be closed by a pressure in chamber 118 without affecting the application and release operations.

The diaphragm 207$^a$, which carries the equalizing check valve 207$^b$, forms the lower wall of a chamber 152 which is connected directly to brake cylinder passage 71$^a$ through a small chamber 71$^b$, so that brake cylinder pressure always will be on top of said diaphragm 207$^a$ and opposed to brake pipe pressure in chamber 207. When, because of repeated brake applications, or otherwise, the brake pipe pressure falls below the equalized brake cylinder pressure the cut-off valve 207$^b$ will be closed by the pressure in chamber 152, thereby preventing further reductions of pressure in the actuating chamber 46. When the brake pipe pressure in chamber 135 is below the brake cylinder pressure in chamber 132 the exhaust throttle valve 139 will be closed and brake cylinder pressure cannot thereafter be exhausted until brake pipe pressure is again raised above the brake cylinder pressure.

The exhaust throttle valve will be closed after a full service application of the brakes when the brake pipe and brake cylinder pressures are substantially equalized and the brake pipe leaks slightly below brake cylinder pressure. To permit an emergency application after a full service application, I provide a by-pass check valve 153 between chambers 138 and 71$^b$. By this arrangement the emergency reservoir air flowing to chamber 138 may flow past valve 153 in the brake cylinder passage 71$^a$, as will be more fully hereinafter described.

Release after service.

For a release of brake cylinder pressure after a service application of brakes the brake pipe pressure is increased in the usual manner through the manipulation of the engineer's brake valve. The increase in brake pipe pressure is registered in chamber 1 and also in the actuating chamber 46. Piston 2 will be moved back to release position and the actuating diaphragm will be depressed moving the valve 60 down to release position. As hereinbefore pointed out, in the quick release position of the release governing valve, brake cylinder pressure will be released to atmosphere through passage 71$^a$, chamber 132, past check valve 139, through chamber 138, passage 71, port 72 of the main slide valve, port and passage 73 of the supplemental slide valve, port 74 of the main slide valve, passage 75, port 76 in the seat of the release governing valve, cavity 77 in the release governing valve, port 78, cavity 79 in the release regulating valve 31, and atmospheric port 80. Brake cylinder pressure will also flow from cavity 77 to atmospheric port 81. In the graduated release position of the release governing valve port 76 will be closed and the main exhaust ports in the main and supplemental valves will be ineffective. In the release position of the valve 60 the service reservoir passage and port 64 will be closed. Port 112 is connected by a branch port 112$^a$ to a port in the seat of valve 60, and said branch port is connected to port 60$^b$ through a restricted port 60$^c$ in the valve 60, when the valve 60 is in release position. Exhaust passage 84 is also connected to port 60$^b$ through a restricted port 60$^d$ in valve 60, and said port 60$^b$ is connected to the passage 90 which leads to the retention chamber 55. The retention chamber is connected to the atmospheric port 88 through 83 and cavity 87 in the valve 26. The passage 84 is connected to atmospheric port 92 through cavity 91 in the main slide valve 10. With the release governing valve in quick release position air from the retention chamber will flow through passage 83, cavity 87 in the release governing valve, and to atmosphere through slot 88. With the release governing valve in graduated release position, port 83 will be cut off from slot 88 and there will be no flow of air from chamber 55 through passage 83. Passage 113$^a$ will be connected to passage 113$^c$ by cavity 113$^b$ in the release governing valve. This will permit brake cylinder pressure to flow back to port and passage 112 independently of valve 114. In the graduated release position of the release governing valve, air from chamber 55 will escape only through the restricted port 89 and port 60$^b$ when the valve 60 is in lap position, as shown in Fig. 4. The purpose of the restricted ports 60$^a$ and 60$^d$ is to ensure a lower pressure in the retention chamber 55 than in the brake cylinder.

The blow-down port 89 is quite small so that the pressure in the chamber 55 will be retained at a diminishing rate slightly below the brake cylinder pressure during the lap period of valve 60. The pressure in chamber 55, that is the differential energy created on the larger controlling diaphragm $b$, opposes the brake cylinder pressure in chamber 51 and tends to move the valve 60 back to lap position. If, while there is pressure in the retention chamber 55, the brake pipe pressure is reduced in order to bring about another application of the brakes, or an increased application of the brakes, the valve 60 will again move to application position and air under pressure will again be delivered to the brake cylinder. It is to be noted that when the valve 60 again goes to service position the port 90 is closed, thereby preventing any further flow of pressure from the retention chamber 55. The brake cylinder pressure must now be built up an additional amount to overcome the differential energy created on the controlling diaphragm $b$ by the pressure retained in chamber 55. Air will continue to flow into the brake cylinder until the pressure has been built up sufficiently to compensate for the loss of pressure in chamber 46 and also to overcome the pressure in chamber 55. This will result in a higher brake cylinder pressure, which will be equal to the trapped retention chamber pressure plus the predetermined ratio for the given reduction in brake pipe pressure. Should the engineman again increase his brake pipe pressure for a release, or a partial release of brakes, the valves 60 will again connect the brake cylinder to the retention chamber 55 and to atmosphere. Should the engineman then again reduce the brake pipe pressure the brake cylinder pressure will be still further built up. This is what is known as "cycling" and is the ordinary and usual operation when running down a grade a train equipped with the standard Westinghouse freight brake. When the grade is heavy the cycling operations are frequent and the periods of application-and-holding, and release-and-re-charging are short, about thirty to sixty seconds, and this short cycling will result in building up a heavy brake cylinder pressure. Where the grade is low the cycling periods are longer, and this slow cycling will not build up as heavy a brake cylinder pressure as will the rapid cycling because the brake cylinder pressure will be released to a lower pressure and likewise the pressure in chamber 55. The amount of pressure retained in the retention chamber 55 will govern the build up of brake cylinder pressure during the cycling operations. It is manifest therefore that if the release-and-re-charging periods are brief as when braking on heavy grades, a greater pressure will be retained in the retention chamber 55 and consequently a greater brake cylinder pressure must be built up on the next service operation in order to overcome the retained pressure in chamber 55. When the brake cycles are less frequent, as when braking on high grades, the release-and-re-charging operations are long and the pressure in chamber 55 has a greater period of time during which it may blow down. The result of this is that the build-up of brake cylinder pressure on the next application-and-holding operation will not be so great because there will not be as high a pressure in chamber 55 as there would have been if the application-and-holding operation followed a short release-and-re-charging operation. It is also manifest that if the release-and-re-charging operation is continued for a considerable period the pressure in chamber 55 will blow down completely and then upon the next service application the brake cylinder pressure will be built up only in proportion to the differential area of the diaphragm for a given brake pipe reduction. When the valve 60 is in release position the entire brake cylinder pressure is free to blow down. When the said valve is in lap position any pressure in the retention chamber is free to blow down through the restricted port 89.

With the release governing valve in quick release position, the quick release piston chamber 101 will be vented to the quick release reservoir G and the quick release piston will be operated inwardly and the quick release valve 104 will be opened, thereby permitting emergency reservoir air to flow to the brake pipe through the passage 107, chamber 148, and passage 39. When the pressure in the quick release reservoir G has equalized with the emergency reservoir pressure in chamber 102, through the equalizing port 109, the quick release piston will be moved outwardly and quick release valve 104 will be closed. By varying the size of the reservoir G the length of time during which the valve 104 will remain open may be varied. This time may be varied also by varying the size of the leak port 109.

The leak port 109 is of such capacity that the pressures will equalize in the quick-release reservoir G, chamber 101, and chamber 102 before the emergency reservoir has equalized into the brake pipe. This will leave a dominating pressure in the emergency reservoir chamber 53 of the diaphragm structure, with the result that the valve 60 will go to application position. It is desirable, therefore, to close the passage 112 through which service reservoir air flows to the brake cylinder when valve 60 is in application position. The equalized pressure in quick-release reservoir G and in chamber 118 will be higher than brake cylinder pressure, with the result that valve 114 will be seated, thereby preventing the flow of air from passage 112 to the brake cylinder. When the supplemental valve 11 is again moved to service application position the quick-release reservoir G and the chamber 118 will be vented to atmosphere and the brake cylinder pressure in chamber 115 will unseat valve 114 and open the passage 112 to the brake cylinder, as hereinbefore described. By closing valve 114 the release of service reservoir air to the brake cylinder and atmosphere, during quick-release operations, is prevented.

The quick-release lever 103 is provided with an adjustable screw 158 which is adapted to engage the quick-release valve 104 and lift it from its seat. By properly adjusting the screw 158 the quick-release lever can be rendered inoperative to lift the quick-release valve. This will prevent the flow of emergency reservoir air to the brake pipe in release operations with the release-governing valve in quick-release position.

The passage 83 is connected to atmosphere through passage 154, cavity 155 in the main slide valve, and passage 156, and said passage is closed by a removable plug $157^a$. By removing the plug $157^a$ the retention chamber 55 is directly open to atmosphere at all times except in emergency regardless of the position of the release-governing valve. This renders the retention chamber ineffective and cuts out the additional brake cylinder pressure build-up in cycling operations.

The supplemental valve in service position connects port 97 of the main slide valve to port 74 of the main slide valve through an extension $73^a$ of the port 73. This places the reservoir G in communication with the atmosphere through the quick-release exhaust port 80.

In the graduated-release position of the release-governing valve, port 94 is connected to port 83 through the cavity 87 in the release-governing valve. This connects the quick-release reservoir G to the retention chamber 55 and augments the volume of that chamber.

In charging the system with the release governing valve in quick release position the quick release reservoir G is charged to full brake pipe pressure. If, with the said reservoir charged, the release governing valve is shifted to graduated release position the quick release reservoir is connected to the retention chamber 55, as hereinbefore pointed out, and the high pressure air from said reservoir will flow to said chamber. To prevent this flow of high pressure air a check valve $83^a$ is arranged in passage 83. This check valve is normally held off its seat by a spring but is adapted to be seated by the high pressure air from the quick release reservoir.

In the release position of the supplemental slide valve, port $73^b$ in said valve connects port 121 of the main slide valve to atmosphere through port 74 and the connected passages. Port $73^b$ is an extension of cavity 73—$73^a$ in the supplemental slide valve. Chambers 123 and 129 will, therefore, be vented to atmosphere in the release position of the supplemental slide valve.

A by-pass $83^b$ is formed around the check valve $83^a$ so that when the check valve is seated by high pressure air from the quick release reservoir G, said high pressure air may leak around said check valve through the by-pass and thence to atmosphere from chamber 55 as hereinbefore described.

*Emergency.*

An emergency application of the brakes can be brought about only by a reduction of brake pipe pressure at an emergency rate. A reduction of brake pipe pressure at this rate results in a reduction of brake pipe pressure in the main valve chamber 1, chamber $1^a$ and chamber 148. The reduction of pressure in chamber 1 will permit the supplemental slide valve and the main piston 2 to move to service position. The spring 18 will prevent the main valve moving to emergency position. The reduction of pressure in chamber 148 at an emergency rate will permit air from the quick action reservoir H to unseat emergency valve 161 against the pressure of spring 162, said valve being guided by a stem 163. When valve 161 is unseated quick-action reservoir air will flow through passage 164 to the emergency piston chamber 165 back of the emergency vent valve piston 166. This pressure will force said piston inwardly and unseat an emergency vent valve 167. When valve 167 is unseated the brake pipe will be opened to a large atmospheric port 168.

When the brake pipe is vented to atmosphere the main valve chamber and the supplemental valve chamber 1ª will also be vented to atmosphere and the main actuating piston 2 will be forced to emergency position. The service stop piston 12 is moved over to the limit of its movement to emergency position and forms an air seal against gasket 133ª. In the actuating reservoir chamber 6 is pivoted an emergency lever 134ª. One arm of this lever is formed with a yoke 157 which fits around the extension 3 of the main piston 2. The other arm of the lever is provided with a contact screw 158ª which is adapted to engage the lower end of the emergency valve 159, and lifts it from its seat. The yoke 157 is adapted to be engaged by the flange 3ª on the outer end of the tubular extension 3 of the piston 2 when said piston has nearly reached its final emergency position. The emergency lever is so proportioned that a slight movement of the yoke end thereof will be sufficient to unseat the valve 159. It is desirable to have as much clearance between the flange 3ª and the yoke 157 as is possible in order to prevent the opening of valve 159 in all movements of the piston 2 except in a desired emergency application. Emergency reservoir air flows through passage 105ª to chamber 105, past check valve 106 and then through passage 104ᵇ to the top of the check valve 159. Service reservoir air flows through passage 106ᵇ to chamber 106ª past check valve 106ᶜ and thence through passage 104ᵇ to the chamber on top of the check valve 159. When the emergency valve 159 is opened emergency reservoir and service reservoir air flows into the actuating reservoir chamber 6 and also down into chamber 38 against the diaphragm 30. The abutment 3ᵇ on the piston 2 engages the main slide valve and moves it inwardly to emergency position. Brake pipe port 33 is closed by the main slide valve. Service reservoir charging ports 35 and 36 are closed by the supplemental valve and the main slide valve. Emergency reservoir air and actuating reservoir air flow from chamber 6 past valve 145 into passage 146 and then to port 160 in the main slide valve which in the emergency position of that valve registers with port and passage 146. Port 160 is also connected to brake cylinder port and passage 71 in the main valve seat and thence through passage 71, passage 140, chamber 138, past check valve 153, passage 71ª to the brake cylinder.

A spring 169 tends to hold valve 167 to its seat. There is a leak port 170 in the emergency valve 161 and leak port 171 in the emergency piston 166. Chamber 148 is vented to atmosphere with the brake pipe, and the air pressure on the opposite side of valve 161 and from chamber 165 will leak down sufficiently to permit springs 162 and 169 to seat their respective valves.

When the main slide valve is in emergency position the port 149 in the main valve seat will be uncovered. Air will flow from chamber 6 past check valve 151 and then through passage and port 149 to main valve chamber 1.

The high brake cylinder pressure in chamber 132 will seat the exhaust throttle valve 139 and the same pressure in chamber 152 will seat the cut-off valve 207ᵇ, chambers 135 and 207 will be vented to atmosphere with the brake pipe. When the valve 207ᵇ is seated the actuating chamber 46 and the release governing valve chamber 29 are cut-off from the brake pipe.

The service valve 60 will go to service position and service reservoir air will flow to the brake cylinder until the brake cylinder pressure in chamber 51 moves said valve to lap position. Check valve 65 prevents back flow of air to the service reservoir.

When the main slide valve is moved to emergency position passages 154, 84 and 92 are closed. With the valve 60 in service position brake cylinder pressure will equalize into chamber 46 and the brake cylinder pressure in chamber 51 will equalize with emergency reservoir pressure in chamber 53.

Release after emergency.

The increasing brake pipe pressure will register in chamber 1ª and will overcome the pressure in chamber 1 and move the piston 12 and valve 10 to the left, thereby opening port 33 to admit the rising brake pipe pressure into chamber 1. The increasing brake pipe pressure in chamber 1 forces piston 2 and valve 11 to the left thereby opening the brake cylinder exhaust passage and bringing the charging ports 34, 35 and 36 into register. The brake cylinder pressure will be released to atmosphere through the release ports, as hereinbefore described. When the brake cylinder pressure in chamber 152 has been sufficiently reduced and the brake pipe pressure in chamber 207 has been sufficiently increased valve 207ᵇ will be opened and brake pipe air will then flow through passage 208 to the actuating chamber 46 and then through passage 209 to the release governing valve chamber 29.

What I claim is:

1. A fluid pressure brake control valve comprising a main slide valve chamber; a main slide valve therein; a supplemntal slide valve superposed on the main slide valve; a main actuating piston connected to the supplemental slide valve; a brake pipe connection with the main slide valve chamber, whereby brake pipe pressure will be applied to the inner side of the main actuating piston; means for applying actuating reservoir pressure to the outer side of said piston whereby a reduction of brake pipe pressure in the main valve chamber will result in an inward movement of the actuating piston and the supplemental slide valve to application position; means for holding the main slide valve stationary during the service movement of the supplemental slide valve; a service valve device; means for moving said valve to service position upon a reduction of brake pipe pressure; means whereby said valve will place a service reservoir and brake pipe in communication with the brake cylinder independently of the main and supplemental slide valves; and means whereby the brake cylinder pressure will move the said service valve to lap position when the desired pressure has been built up in the brake cylinder.

2. A fluid pressure brake control valve comprising a main slide valve chamber; a main slide valve therein; a supplemental slide valve superposed on the main slide valve; a main actuating piston connected to the supplemental slide valve; a brake pipe connection with the main slide valve chamber, whereby brake pipe pressure will be applied to the inner side of the main actuating piston; means for applying actuating reservoir pressure to the outer side of said piston whereby a reduction of brake pipe pressure in the main valve chamber will result in an inward movement of the actuating piston and the supplemental slide valve to application position; means for holding the main slide valve stationary during the service movement of the supplemental slide valve; a valve device operating upon a reduction of brake pipe pressure to connect the brake pipe and a reservoir to the brake cylinder independently of the main and supplemental slide valve when the supplemental valve is in service position; and means to move said valve device to lap position when the desired pressure is in the brake cylinder and while maintaining the supplemental slide valve in service position.

3. A fluid pressure brake control valve comprising a slide valve chamber; a slide valve therein; an actuating piston connected to said slide valve; a brake pipe connection with the main slide valve chamber whereby brake pipe pressure will be applied to the valve chamber side of the actuating piston; means for applying a reservoir pressure to the other side of said piston whereby a reduction of brake pipe pressure in the valve chamber will result in an inward movement of the actuating piston and the connected slide valve to application position; means for arresting the said slide valve in service position; a service braking valve device; means for moving the said valve to service position upon a reduction of brake pipe pressure; means whereby said service valve will place a reservoir and the brake pipe in communication with the brake cylinder independently of the slide valve in the slide valve chamber when said valve is in service position; and means whereby the brake cylinder pressure will move the said service valve to lap position when the desired pressure has been built up in the brake cylinder.

4. A fluid pressure brake control valve comprising a slide valve chamber; a slide valve therein; an actuating piston connected to said slide valve; a brake pipe connection with the slide valve chamber whereby brake pipe pressure will be applied to the valve chamber side of the actuating piston; means for applying a reservoir pressure to the other side of said piston whereby a reduction of brake pipe pressure in the valve chamber will result in an inward movement of the actuating piston and the connected slide valve to application position; means for arresting the said slide valve in service position; a valve device operating upon a reduction of brake pipe pressure to connect the brake pipe and a reservoir to the brake cylinder independently of the slide valve in the slide valve chamber when the said slide valve is in service position; and means to move said valve device to lap position when the desired pressure is in the brake cylinder and while maintaining the said slide valve in service position.

5. A fluid pressure brake control valve comprising a main slide valve chamber; a main slide valve therein; a supplemental slide valve superposed on the main slide valve; a main actuating piston connected to the supplemental slide valve; a brake pipe connection with the main slide valve chamber, whereby brake pipe pressure will be applied to the inner side of the main actuating piston; means for applying actuating reservoir pressure to the outer side of said piston whereby a reduction of brake pipe pressure in the main slide valve chamber will result in an inward movement of the actuating piston and the supplemental slide valve to application position; means for holding the main slide valve stationary during the service movement of the supplemental slide valve; a service valve device; means for moving said service valve to service position upon a reduction of brake pipe pressure; means whereby said service valve will place a service reservoir and brake pipe in communication with the brake cylinder independently of the main and supplemental slide valves when the said supplemental valve is in service position; means whereby the brake cylinder pressure will move the said service valve to lap position when the desired pressure has been built up in the brake cylinder; means whereby an emergency reduction of brake pipe pressure will cause the actuating piston to move the main slide valve and the supplemental slide valve to emergency position; and means whereby said main slide valve in emergency position will connect an emergency reservoir to the brake cylinder.

6. A fluid pressure brake control valve comprising a main slide valve chamber; a main slide valve therein; a supplemental slide valve superposed on the main slide valve; a main actuating piston connected to the supplemental slide valve; a brake pipe connection with the main slide valve chamber, whereby brake pipe pressure will be applied to the inner side of the main actuating piston; means for applying actuating reservoir pressure to the outer side of said piston whereby a reduction of brake pipe pressure in the main slide valve chamber will result in an inward movement of the actuating piston and the supplemental slide valve to application position; means for holding the main slide valve stationary during the service movement of the supplemental slide valve; a valve device operating upon a reduction of brake pipe pressure to connect the brake pipe and a reservoir to the brake cylinder independently of the main and supplemental slide valves when the supplemental valve is in service position; means to move said valve device to lap position when the desired pressure is in the brake cylinder and while maintaining the supplemental slide valve in service position; means whereby an emergency reduction of brake pipe pressure will cause the actuating piston to move the main slide valve and the supplemental slide valve to emergency position; and means whereby said main slide valve in emergency position will connect an emergency reservoir to the brake cylinder.

7. A fluid pressure brake control valve comprising a slide valve chamber; a slide valve therein; an actuating piston connected to said slide valve; a brake pipe connection with the slide valve chamber whereby brake pipe pressure will be applied to the valve chamber side of the actuating piston; means for applying a reservoir pressure to the other side of the said piston whereby a reduction of brake pipe pressure in the valve chamber will result in an inward movement of the actuating piston and the connected slide valve to application position; means for arresting the said slide valve in service position; a service valve device subject to brake pipe, brake cylinder and emergency reservoir pressures, said valve moving to service position upon a reduction of brake pipe pressure; and means whereby said service valve will place a service reservoir and the brake pipe in communication with the brake cylinder independently of the slide valve in the slide valve chamber when said slide valve is in service position, the brake cylinder pressure moving said service valve to lap position when the desired pressure has been built up in the brake cylinder.

8. A fluid pressure brake control valve comprising a main slide valve chamber; a main slide valve therein; a supplemental slide valve superposed on the main slide valve; a main actuating piston connected to the supplemental slide valve; a brake pipe connection with the main slide valve chamber, whereby brake pipe pressure will be applied to the inner side of the main actuating piston; means for applying actuating reservoir pressure to the outer side of said piston whereby a reduction of brake pipe pressure in the main valve chamber will result in an inward movement of the actuating piston and the supplemental slide valve to application position; means for holding the main slide valve stationary during the service movement of the supplemental slide valve; a service valve device subject to brake pipe, brake cylinder and emergency reservoir pressures, said valve moving to service position upon a reduction of brake pipe pressure; and means whereby said service valve will place a service reservoir and the brake pipe in communication with the brake cylinder independently of the slide valve in the main slide valve chamber when said slide valve is in service position, the brake cylinder pressure moving said service valve to lap position when the desired pressure has been built up in the brake cylinder.

9. A fluid pressure brake control valve comprising a service valve operating upon a service reduction of brake pipe pressure to connect a brake pipe and a service reservoir to the brake cylinder for a service application of the brakes; and main and supplemental slide valves in a main slide valve chamber, the supplemental slide valve moving to service position upon a service reduction of brake pipe pressure, said valve in service position admitting brake pipe air and actuating reservoir air to the brake cylinder for a service application of the brakes, the main and supplemental slide valves responding to an emergency reduction of brake pipe pressure to place an emergency reservoir and a service reservoir in communication with the brake cylinder independently of the service valve for an emergency application of the brakes.

10. A fluid pressure brake control valve comprising a service valve operating upon a service reduction of brake pipe pressure to connect a brake pipe and a service reservoir to the brake cylinder for a service application of the brakes; main and supplemental slide valves in a main slide valve chamber, the supplemental slide valve moving to service position upon a service reduction of brake pipe pressure, said valve in service position admitting brake pipe air and actuating reservoir air to the brake cylinder for a service application of the brakes; means operating independently of the main and supplemental slide valves to limit the flow of actuating reservoir air to the brake cylinder in service applications; and means operating independently of the main and supplemental slide valves to limit the flow of brake pipe air through the main slide valve to the brake cylinder, the main and supplemental slide valves responding to an emergency reduction of brake pipe pressure to place an emergency reservoir and a service reservoir in communication with the brake cylinder independently of the service valve for an emergency application of the brakes.

11. A fluid pressure brake control valve comprising a service valve operating upon a service reduction of brake pipe pressure to connect a brake pipe and a service reservoir to the brake cylinder for a service application of the brakes; main and supplemental slide valves in a main slide valve chamber, the supplemental slide valve moving to service position upon a service reduction of brake pipe pressure, said valve in service position admitting actuating reservoir air to the brake cylinder for a service application of the brakes; and means operating independently of the main and supplemental slide valves to limit the flow of actuating reservoir air to the brake cylinder in service applications, the main and supplemental slide valves responding to an emergency reduction of brake pipe pressure to place an emergency reservoir and a service reservoir in communication with the brake cylinder independently of the service valve for an emergency application of the brakes.

12. A fluid pressure brake control valve comprising a service valve operating upon a service reduction of brake pipe pressure to connect a brake pipe and a service reservoir to the brake cylinder for a service application of the brakes; main and supplemental slide valves in a main slide valve chamber, the supplemental slide valve moving to service position upon a service reduction of brake pipe pressure, said valve in service position admitting brake pipe air to the brake cylinder for a service application of the brakes; and means operating independently of the main and supplemental slide valves to limit the flow of brake pipe air through the main slide valve to the brake cylinder, the main and supplemental slide valves responding to an emergency reduction of brake pipe pressure to place an emergency reservoir and a service reservoir in communication with the brake cylinder independently of the service valve for an emergency application of the brakes.

13. A fluid pressure brake control valve comprising a main slide valve chamber; a main slide valve therein; a supplemental slide valve superposed on the main slide valve; a main actuating piston connected to the supplemental slide valve; a brake pipe connection with the main slide valve chamber, whereby brake pipe pressure will be applied to the inner side of the main actuating piston; means for applying actuating reservoir pressure to the outer side of said piston whereby a reduction of brake pipe pressure in the main slide valve chamber will result in an inward movement of the actuating piston and the supplemental slide valve to application position; means for holding the main slide valve stationary during the service movement of the supplemental slide valve; means whereby the supplemental slide valve in service position will admit actuating reservoir air to the brake cylinder; a valve device operating upon a reduction of brake pipe pressure to connect a reservoir to the brake cylinder; and means to move said valve device to lap position when the desired pressure is in the brake cylinder and while maintaining the supplemental slide valve in service position.

14. A fluid pressure brake control valve comprising a main slide valve chamber; a main slide valve therein; a supplemental slide valve superposed on the main slide valve; a main actuating piston connected to the supplemental slide valve; a brake pipe connection with the main slide valve chamber, whereby brake pipe pressure will be applied to the inner side of the main actuating piston; means for applying actuating reservoir pressure to the outer side of said piston whereby a reduction of brake pipe pressure in the main slide valve chamber will result in an inward movement of the actuating piston and the supplemental slide valve to application position; means for holding the main slide valve stationary during the service movement of the supplemental slide valve; means whereby the supplemental slide valve in service position will admit brake pipe air to the brake cylinder; means to limit the amount of brake pipe air flowing to the brake cylinder through the supplemental valve; a valve device operating upon a reduction of brake pipe pressure to connect a reservoir to the brake cylinder; and means to move said valve device to lap position when the desired pressure is in the brake cylinder and while maintaining the supplemental slide valve in service position.

15. A fluid pressure brake control valve comprising a main slide valve chamber; a main slide valve therein; a supplemental slide valve superposed on the main slide valve; a main actuating piston connected to the supplemental slide valve; a brake pipe connection with the main slide valve chamber, whereby brake pipe pressure will be applied to the inner side of the main actuating piston; means for applying actuating reservoir pressure to the outer side of said piston whereby a reduction of brake pipe pressure in the main slide valve chamber will result in an inward movement of the actuating piston and the supplemental slide valve to application position; means for holding the main slide valve stationary during the service movement of the supplemental slide valve; means whereby the supplemental slide valve in service position will admit actuating reservoir air to the brake cylinder; a valve controlled by brake pipe and actuating reservoir pressures to close communication between the actuating reservoir and the supplemental valve ports upon a substantial equalization of brake pipe and actuating reservoir pressures; a valve device operating upon a reduction of brake pipe pressure to connect a reservoir to the brake cylinder; and means to move said valve device to lap position when the desired pressure is in the brake cylinder and while maintaining the supplemental slide valve in service position.

16. A fluid pressure brake control valve comprising a main slide valve chamber; a main slide valve therein; a supplemental slide valve superposed on the main slide valve; a main actuating piston connected to the supplemental slide valve; a brake pipe connection with the main slide valve chamber, whereby brake pipe pressure will be applied to the inner side of the main actuating piston; means for applying actuating reservoir pressure to the outer side of said piston whereby a reduction of brake pipe pressure in the main slide valve chamber will result in an inward movement of the actuating piston and the supplemental slide valve to application position; means for holding the main slide valve stationary during the service movement of the supplemental slide valve; means whereby the supplemental slide valve in service position will admit brake pipe air to the brake cylinder; means to limit the amount of brake pipe air flowing to the brake cylinder through the supplemental valve; a pressure-controlled valve interposed between the supplemental valve port and the brake cylinder to regulate the amount of brake pipe air flowing to the brake cylinder through the supplemental slide valve; a valve device operating upon a reduction of brake pipe pressure to connect a reservoir to the brake cylinder; and means to move said valve device to lap position when the desired pressure is in the brake cylinder and while maintaining the supplemental slide valve in service position.

17. A fluid pressure brake control valve comprising means operating upon a reduction of brake pipe pressure to admit air to a brake cylinder for an application of the brakes, and operating upon an increase of brake pipe pressure to release air from the brake cylinder; an exhaust throttle valve; and means whereby said valve will be controlled by brake pipe and brake cylinder pressure and will be closed when brake cylinder pressure exceeds brake pipe pressure.

18. A fluid pressure brake control valve, comprising means operating upon a reduction of brake pipe pressure to admit air to a brake cylinder for an application of the brakes, and operating upon an increase of brake pipe pressure to release air from the brake cylinder; an exhaust throttle valve interposed between the brake cylinder and the means for admitting air to said cylinder and exhausting it therefrom; means whereby brake pipe pressure will tend to open said valve; and means whereby brake cylinder pressure will tend to close said valve.

19. A fluid pressure brake control valve comprising means operating upon a service reduction of brake pipe pressure to admit air to a brake cylinder for a service application of the brakes and operating upon an emergency reduction of brake pipe pressure to admit air to the brake cylinder for an emergency application of the brakes, and operating upon an increase in brake pipe pressure to release air from the brake cylinder; an exhaust throttle valve interposed between the brake cylinder and the means for admitting air to said cylinder and exhausting it therefrom; means whereby brake pipe pressure will tend to open said valve; means whereby brake cylinder pressure will tend to close said valve; a by-pass around the said throttle valve; and means whereby the emergency braking air may pass through the by-pass to the brake cylinder with the exhaust throttle valve closed.

20. A fluid pressure brake control valve comprising a service valve subject to brake pipe, brake cylinder and emergency reservoir pressures and operating upon a reduction of brake pipe pressure to place the brake pipe and a service reservoir in communication with the brake cylinder for a service application of the brakes, the brake cylinder pressure assisting the brake pipe pressure in moving the said valve to lap position; and main and supplemental slide valves in a main slide valve chamber and subject to brake pipe pressure and acting reservoir pressure, the supplemental slide valve moving to service position upon a service reduction of brake pipe pressure, said valve in service position admitting actuating reservoir air to the brake cylinder for a service application of the brakes, the main and supplemental slide valves being operated by actuating reservoir pressure to emergency position upon an emergency reduction of brake pipe pressure, the said main valve in emergency position connecting an emergency reservoir and an actuating reservoir to the brake cylinder for an emergency application of the brakes.

21. A fluid pressure brake control valve in accordance with claim 20 and provided with means whereby the main slide valve and supplemental slide valve in full-release position will operate means to connect the emergency reservoir to the brake pipe for a quick release of the brakes.

22. A fluid pressure brake control valve in accordance with claim 20 and provided with means whereby the main slide valve and supplemental slide valve in full-release position will operate means to connect the emergency reservoir to the brake pipe for a predetermined period for a quick release of the brakes.

23. A fluid pressure brake control valve in accordance with claim 20 and provided with means whereby the main slide valve and supplemental slide valve in full-release position will operate means to connect the emergency reservoir to the brake pipe for a quick release of the brakes; and means to close communication between the service valve and the brake cylinder during quick-release operations of the control valve.

24. A fluid pressure brake control valve in accordance with claim 20 and provided with means whereby the main slide valve and supplemental slide valve in full-release position will operate means to connect the emergency reservoir to the brake pipe for a predetermined period for a quick release of the brakes; and means to close communication between the service valve and the brake cylinder during quick-release operations of the control valve.

25. A fluid pressure brake control valve in accordance with claim 20 and provided with a release-governing valve having a graduated-release position and a quick-release position, said valve in its graduated-release position rendering the main exhaust port of the main slide valve ineffective and preventing the flow of emergency reservoir air to the brake pipe whereby the release of brake cylinder pressure will be controlled by the service valve, said release-governing valve in its quick-release position rendering the main slide valve effective in release operations and the supplemental slide valve in release position cooperating with the main slide valve to operate means to admit the emergency reservoir air into the brake pipe for a quick release of the brakes; and means to close communication between the brake cylinder port of the service valve and the brake cylinder during release operations with the release governing valve in quick-release position.

26. A fluid pressure brake control valve operating upon a slow reduction of brake pipe pressure to admit air to the brake cylinder for a service application of the brakes and operating upon a sudden reduction of brake pipe pressure to admit emergency reservoir air to the brake cylinder for an emergency application of the brakes, and operating upon an increase in brake pipe pressure to connect the brake cylinder to atmosphere, and provided with an emergency vent valve controlling communication between the brake pipe and atmosphere; an emergency vent valve piston; an emergency valve controlling a port leading to the emergency vent valve piston chamber; and means operating upon an emergency reduction of brake pipe pressure to permit quick-action-reservoir air to open said valve whereby the emergency vent valve piston will be moved by quick-action-reservoir air to open the emergency vent valve.

27. A fluid pressure brake control valve operating upon a slow reduction of brake pipe pressure to admit air to the brake cylinder for a service application of the brakes and operating upon a sudden reduction of brake pipe pressure to admit emergency reservoir air to the brake cylinder for an emergency application of the brakes, and operating upon an increase in brake pipe pressure to connect the brake cylinder to atmosphere, and provided with an emergency vent valve controlling communication between the brake pipe and atmosphere; an emergency vent valve piston; an emergency valve controlling a port leading to the emergency vent valve piston chamber; means to admit brake pipe air on one side of said emergency valve to hold it closed; means to admit reservoir air to the opposite side of said emergency valve, whereby upon an emergency reduction of brake pipe pressure the emergency valve will be opened and the vent valve piston will be moved to open the vent valve; and means whereby air on opposite sides of the emergency valve and the piston will leak down to permit the emergency valve and the vent valve to close.

28. A control valve for air brake apparatus comprising main and supplemental slide valves; means to control the movements of said valves by opposed brake pipe pressure and pressure from a reservoir, whereby said valves will move to service or emergency position upon the required reduction of brake pipe pressure; a graduated-release valve subject to brake pipe, brake cylinder and emergency reservoir pressures; an emergency brake pipe vent valve; and means operating upon an emergency reduction of brake pipe pressure to open said vent valve independently of the main and supplemental slide valves and the graduated-release valve.

29. A control valve for air brake apparatus comprising main and supplemental slide valves; means to control the movements of said valves by opposed brake pipe pressure and pressure from a reservoir, whereby said valves will move to service or emergency position upon the required reduction of brake pipe pressure; an emergency brake pipe vent valve; and means operating upon an emergency reduction of brake pipe pressure to open said vent valve independently of the main and supplemental slide valves.

30. A fluid pressure brake control valve comprising a service and graduated-release valve subject to brake pipe, brake cylinder and emergency reservoir pressures and operating upon a reduction of brake pipe pressure to place a service reservoir in communication with the brake cylinder for a service application of the brakes, the brake cylinder pressure assisting the brake pipe pressure in moving the said service valve to lap position; main and supplemental slide valves in a main slide valve chamber and subject to brake pipe pressure and to the pressure from a reservoir, the supplemental slide valve moving to service position upon a service reduction of brake pipe pressure; a cut-off valve interposed between the brake pipe and the brake pipe chamber of the service valve; means whereby brake pipe air will tend to open said valve; and means whereby brake cylinder pressure will tend to close said valve, whereby when the brake cylinder pressure exceeds brake pipe pressure said cut-off valve will be closed to cut off the brake pipe chamber of the service valve from the brake pipe.

31. A fluid pressure brake control valve comprising a valve operating upon a service reduction of brake pipe pressure to connect an air supply reservoir to the brake cylinder for a service application of the brakes; means operated by a service reduction of brake pipe pressure to connect the brake pipe to the brake cylinder, said means closing said communication after a predetermined time interval, to thereby limit the amount of brake pipe air flowing to the brake cylinder through said means in service applications of the brakes.

32. A fluid pressure brake control valve comprising a slide valve operating to service position upon a service reduction of brake pipe pressure to connect an air reservoir to the brake cylinder in a service application of the brakes, said slide valve in service position placing the brake pipe in communication with the brake cylinder; a pressure controlled valve; and means whereby said pressure controlled valve will close said communication to the brake cylinder after a predetermined time interval independently of the slide valve to limit the amount of brake pipe air flowing to the brake cylinder from the said slide valve, said pressure controlled valve operating to closed position independently of the movement of the slide valve.

33. A fluid pressure brake control valve comprising a pressure-controlled valve operating upon a service reduction of brake pipe pressure to connect a reservoir to the brake cylinder in a service application of the brakes; a slide valve in a valve chamber; means to move said valve to service position upon a service reduction of brake pipe pressure, said valve in service position admitting brake pipe air to the brake cylinder in a service application of the brakes; means operating independently of the said slide valve to stop the flow of brake pipe air to the brake cylinder through the said slide valve after a predetermined time interval.

34. A fluid pressure brake control valve comprising a pressure-controlled valve operating upon a service reduction of brake pipe pressure to connect a reservoir to the brake cylinder in a service application of the brakes; a slide valve in a valve chamber; a piston operatively connected to said slide valve; means whereby said piston will be subject on one side to brake pipe pressure; means whereby said piston will be subject on its other side to a reservoir pressure whereby said piston and slide valve will be moved to service position by the reservoir air upon a service reduction of brake pipe pressure; means whereby said slide valve in service position will connect the said reservoir to the brake cylinder in the service application of the brakes; and means operating independently of the said slide valve to limit the flow of reservoir air to the brake cylinder through the slide valve.

35. A fluid pressure brake control valve comprising a pressure-controlled valve operating upon a service reduction of brake pipe pressure to connect a reservoir to the brake cylinder in a service application of the brakes; a slide valve in a valve chamber; a piston operatively connected to said slide valve; means whereby said piston will be subject on one side to brake pipe pressure; means whereby said piston will be subjected on its other side to a reservoir pressure whereby said piston and slide valve will be moved to service position by the reservoir air upon a service reduction of brake pipe pressure; means whereby said slide valve in service position will connect the said reservoir to the brake cylinder in the service application of the brakes; and means operating independently of the said slide valve to stop the flow of reservoir air to the brake cylinder through the slide valve upon an equalization of brake pipe and said reservoir pressures.

36. A fluid pressure brake control valve comprising a pressure controlled valve operating upon a service reduction of brake pipe pressure to connect a service reservoir to the brake cylinder; a slide valve in a main slide valve chamber said valve moving to service position upon a service reduction of brake pipe pressure; means whereby said slide valve in service position will admit actuating reservoir air to the brake cylinder; and means operating independently of the said slide valve to limit the flow of actuating reservoir air to the brake cylinder in service applications of the brakes.

37. A fluid pressure brake control valve comprising a pressure controlled valve operating upon a service reduction of brake pipe pressure to connect a service reservoir to the brake cylinder; a slide valve in a main slide valve chamber said valve moving to service position upon a service reduction of brake pipe pressure; means whereby said slide valve in service position will admit actuating reservoir air to the brake cylinder; and means operating independently of the said slide valve to stop the flow of actuating reservoir air to the brake cylinder when there is a substantial equalization of brake pipe and actuating reservoir pressures.

38. A fluid pressure brake control valve comprising a pressure controlled valve operating upon a service reduction of brake pipe pressure to connect a service reservoir to the brake cylinder; means whereby brake cylinder pressure will move said pressure controlled valve to service lap position; a slide valve in a main slide valve chamber said valve moving to service position upon a service reduction of brake pipe pressure; means whereby said slide valve in service position will admit actuating reservoir air to the brake cylinder; and means operating independently of the said slide valve to stop the flow of actuating reservoir air to the brake cylinder when there is a substantial equalization of brake pipe and actuating reservoir pressures.

39. A fluid pressure control valve comprising a pressure controlled valve operating upon a service reduction of brake pipe pressure to connect a service reservoir to the brake cylinder; means whereby brake cylinder pressure will move said pressure controlled valve to service lap position; a slide valve in a main slide valve chamber, said valve moving to service position upon a service reduction of brake pipe pressure; means whereby said slide valve in service position will admit brake pipe air to the brake cylinder; and means operating independently of the said slide valve to stop the flow of brake pipe air to the brake cylinder through said slide valve after a predetermined time interval.

40. A fluid pressure brake control valve comprising a slide valve operating to service position upon a service reduction of brake pipe pressure to connect a reservoir to the brake cylinder, said slide valve in service position connecting the brake pipe to the brake cylinder; a normally closed valve interposed between the said slide valve and the brake cylinder to interrupt the flow of brake pipe air to the said cylinder; a diaphragm connected to said normally closed valve; a spring operating on said diaphragm to normally close said valve; means whereby brake pipe air flowing from the said slide valve will move the said diaphragm in opposition to the said spring and open said valve to permit brake pipe air to flow to the brake cylinder; and means whereby brake pipe air will tend to equalize on opposite sides of the said diaphragm and permit said spring to close said valve to stop the flow of brake pipe air to the brake cylinder through the slide valve.

41. A fluid pressure brake control valve comprising a pressure controlled valve subject to brake pipe, brake cylinder and emergency reservoir pressures and operating upon a reduction of brake pipe pressure to place a source of braking pressure in communication with the brake cylinder, the brake cylinder pressure assisting the brake pipe pressure in moving said pressure controlled valve to service lap position; a cut-off valve interposed between the brake pipe and the brake pipe chamber of the said pressure controlled valve; means whereby the brake pipe air will tend to open said cut-off valve; and means whereby the brake cylinder pressure will tend to close said cut-off valve, whereby when the brake cylinder pressure exceeds brake pipe pressure said cut-off valve will be closed to cut-off the brake pipe chamber of the pressure controlled valve from the brake pipe.

42. A fluid pressure brake control valve comprising a graduated release valve subject to brake pipe, brake cylinder and emergency reservoir pressures and operating upon a reduction of brake pipe pressure to place a source of pressure in communication with the brake cylinder, the brake cylinder pressure assisting in moving the said pressure-controlled valve to service lap position; a slide valve in a main slide valve chamber and subject to brake pipe pressure and to the pressure from a reservoir, said valve moving to service position upon a service reduction of brake pipe pressure and in service position connecting said reservoir to the brake cylinder; means whereby said slide valve will move to emergency position upon an emergency reduction of brake pipe pressure and in said position connect an emergency reservoir to the brake cylinder; means whereby said slide valve will move to release position upon an increase of brake pipe pressure; and means whereby the said slide valve in release position will operate means to connect the emergency reservoir to the brake pipe for a predetermined period for a quick release of the brakes, and means to close communication between the said pressure-controlled graduated release valve and the brake cylinder when the slide valve is in release position.

43. A fluid pressure brake control valve in accordance with claim 42, and provided with a release-governing valve having a graduated release position and a quick-release position, said valve in its graduated release position rendering the main exhaust port of the slide valve ineffective and preventing the flow of emergency reservoir air to the brake pipe, whereby the release of brake cylinder pressure will be controlled by the graduated-release valve said release-governing valve in its quick-release position rendering the said slide valve effective in release operations and cooperating with the said slide valve to operate means to admit the emergency reservoir air into the brake pipe for a quick release of the brakes; and means to close communication between the brake cylinder and the graduated-release valve during release operations with the release-governing valve in quick-release position.

In testimony whereof I hereunto affix my signature.

WILLIAM ASTLE.